United States Patent
Jin et al.

(10) Patent No.: US 10,719,251 B2
(45) Date of Patent: Jul. 21, 2020

(54) SYSTEM AND METHOD FOR RECURSIVE DE-DUPLICATION

(71) Applicant: Nutanix, Inc., San Jose, CA (US)

(72) Inventors: Xingchi Jin, San Jose, CA (US); Karan Gupta, San Jose, CA (US); Pavan Konka, Milpitas, CA (US)

(73) Assignee: NUTANIX, INC., San Jose, CA (US)

( * ) Notice: Subject to any disclaimer, the term of this patent is extended or adjusted under 35 U.S.C. 154(b) by 222 days.

(21) Appl. No.: 15/884,557

(22) Filed: Jan. 31, 2018

(65) Prior Publication Data

US 2019/0235778 A1 Aug. 1, 2019

(51) Int. Cl.
G06F 3/06 (2006.01)
G06F 9/455 (2018.01)
G06F 16/14 (2019.01)
G06F 16/174 (2019.01)
H04L 9/06 (2006.01)
H04L 29/08 (2006.01)

(52) U.S. Cl.
CPC .......... *G06F 3/0641* (2013.01); *G06F 3/0608* (2013.01); *G06F 9/45558* (2013.01); *G06F 16/152* (2019.01); *G06F 16/1752* (2019.01); *H04L 67/1097* (2013.01); *G06F 2009/45583* (2013.01); *H04L 9/0643* (2013.01)

(58) Field of Classification Search
CPC .. G06F 3/0641; G06F 16/1752; G06F 16/152; G06F 9/45558; G06F 3/0608; G06F 2009/45583; G06F 3/067; H04L 67/1097; H04L 9/0643; H04L 9/3239
See application file for complete search history.

(56) References Cited

U.S. PATENT DOCUMENTS

| 8,549,518 | B1 | 10/2013 | Aron et al. | |
|---|---|---|---|---|
| 8,601,473 | B1 | 12/2013 | Aron et al. | |
| 8,832,034 | B1* | 9/2014 | Ramarao | G06F 16/1748 707/664 |
| 8,850,130 | B1 | 9/2014 | Aron et al. | |
| 9,772,866 | B1 | 9/2017 | Aron et al. | |
| 2011/0016095 | A1* | 1/2011 | Anglin | G06F 11/1453 707/692 |

(Continued)

OTHER PUBLICATIONS

Poitras, Steven. "The Nutanix Bible" (Jan. 11, 2014), from http://stevenpoitras.com/the-nutanix-bible/ (Publication date based on indicated capture date by Archive.org; first publication date unknown).

(Continued)

*Primary Examiner* — Jorge A Casanova
(74) *Attorney, Agent, or Firm* — Foley & Lardner LLP

(57) ABSTRACT

A virtual computing system deduplicates data. The system includes one or more processors, and one or more computer-readable storage media communicably coupled to the one or more processors. The one or more computer-readable storage media has instructions stored thereon that, when executed by the one or more processors, cause the one or more processors to: scan extents for duplicate data chunks; calculate hash values for the extents at different chunk lengths; emit the hash values at the different chunk lengths; identify matching ones of the hash values; and select one or more candidates from among the matching ones of the hash values for dedup.

18 Claims, 8 Drawing Sheets

(56) References Cited

U.S. PATENT DOCUMENTS

2012/0290537 A1* 11/2012 Smith ............... G06F 3/0608
  707/654
2013/0054545 A1* 2/2013 Anglin ............... G06F 3/0608
  707/693

OTHER PUBLICATIONS

Poitras, Steven. "The Nutanix Bible" (Jan. 12, 2016), from https://nutanixbible.com/.
Poitras, Steven. "The Nutanix Bible" (Oct. 15, 2013), from http://stevenpoitras.com/the-nutanix-bible/ (Publication date based on indicated capture date by Archive.org; first publication date unknown).
Poitras, Steven. "The Nutanix Bible" (Jun. 20, 2014), from http://stevenpoitras.com/the-nutanix-bible/ (Publication date based on indicated capture date by Archive.org; first publication date unknown).
Poitras, Steven. "The Nutanix Bible" (Jun. 25, 2018), from https://nutanixbible.com/.
Poitras, Steven. "The Nutanix Bible" (Jan. 3, 2017), from https://nutanixbible.com/.
Poitras, Steven. "The Nutanix Bible" (Jan. 3, 2018), from https://nutanixbible.com/.
Poitras, Steven. "The Nutanix Bible" (Sep. 4, 2015), from https://nutanixbible.com/.
Poitras, Steven. "The Nutanix Bible" (Jan. 7, 2015), from http://stevenpoitras.com/the-nutanix-bible/ (Publication date based on indicated capture date by Archive.org; first publication date unknown).
Poitras, Steven. "The Nutanix Bible" (Jan. 8, 2019), from https://nutanixbible.com/.
Poitras, Steven. "The Nutanix Bible" (Jun. 8, 2017), from https://nutanixbible.com/.
Poitras, Steven. "The Nutanix Bible" (Jun. 9, 2015), from http://stevenpoitras.com/the-nutanix-bible/ (Publication date based on indicated capture date by Archive.org; first publication date unknown).
Poitras, Steven. "The Nutanix Bible" (Jun. 9, 2016), from https://nutanixbible.com/.
Cano, Ignacio, et al. "Curator: Self-Managing Storage for Enterprise Clusters" (Mar. 27, 2017), from https://www.usenix.org/conference/nsdi17/.

\* cited by examiner

Dedup Savings with Different Levels Involved

| Source: | installed_from_iso.vmdk | 1.9 G | installed_from_iso.vdi | 2.2 G | Cell format: | | savings(KB) #chunks to be deduped / # new extens | |
|---|---|---|---|---|---|---|---|---|
| Source Description: | take "ubuntu-14.04.5-server-amd64.iso", install with VMDK format and VDI format. | | | | | | | |
| | vmdk: mail server, encrypt home dir, git, pip, golang | | | | | | | |
| | vdi: SSH server, mongodb, awsdi, java, clang | | | | | | | |
| FrameLen: | 1024 KB | | | | | | | |
| | 1024 KB | 512 KB | 256 KB | 128 KB | 64 KB | 32 KB | 16 KB | 8 KB |
| AllShifts | 113664 | 460256 | 807424 | 1117568 | 1376960 | 1509856 | 1618288 | NA |
| OneShift | NA | 210432 | 365536 | 708480 | 1285632 | 1456416 | 1618288 | NA |
| zeroShift(baseline) | NA | . | . | . | . | . | . | . |
| Levels Merged (Start from 1024 KB)(all shifts) | 113664 | 460288 | 759920/213373/67316 | 1015040 | . | 1547280/153374/203712 | 1698680 | |
| Levels Merged (Start from 512 KB)(all shifts) | NA | 460256 | 779520 | 1042432 | . | 1432752/77639/68304 | . | . |
| Levels Merged (Start from 256 KB)(all shifts) | NA | NA | 807424 | 1100288 | . | . | . | . |
| Levels Merged (Start from 128 KB)(one shift) | NA | NA | NA | 708480 | 1191936 | 1326784 | 1446512 | . |

FIG. 4

SYSTEM AND METHOD FOR RECURSIVE DE-DUPLICATION

BACKGROUND

The following description is provided to assist the understanding of the reader. None of the information provided or references cited is admitted to be prior art.

Deduplication (or dedup) is a type of data compression technique to reduce duplicate copies of repeating data. Data chunks are compared with unique chunks of data, and when there is a match, the duplicate data is deduped. When data is deduped, an entry is generally created in metadata (e.g., in a metadata map) with a reference to the deduped data that points to the corresponding unique chunks of data. In some deduplication systems, dedup chunks may be at a fixed length. In this case, some of the data chunks may have duplicate data that could have been deduped at a much larger chunk level, but instead, are deduped into the smaller fixed lengths. Accordingly, metadata and fragmented data may increase, resulting in degraded performance.

SUMMARY

One implementation of the present disclosure is virtual computing system for deduplicating data. The system includes one or more processors and one or more computer-readable storage media. The one or more computer readable storage media are communicably connected to the one or more processors, and have instructions stored thereon. When executed by the one or more processors, the instructions cause the one or more processors to: scan extents for duplicate data chunks; calculate hash values for the extents at different chunk lengths; emit the hash values at the different chunk lengths; identify matching ones of the hash values; and select one or more candidates from among the matching ones of the hash values for dedup.

In some embodiments, the scanning of the extents may include: scanning the extents over a first length; and scanning the extents over a second length different from the first length.

In some embodiments, the calculating of the hash values may include: calculating a first hash value at the first length; and calculating a second hash value at the second length.

In some embodiments, the second hash value may be a duplicate of a portion of the first hash value, and the second hash value may be referenced by an extent family of the first hash value including an offset reference identifying a starting position and a length of the portion within the first hash value that may be the duplicate of the second hash value.

In some embodiments, the calculating of the second hash value at the second length may include skipping ones of the one or more candidates that match the first hash value, and calculating the second hash value on remaining ones of the data chunks at the second length.

In some embodiments, the second hash value may be calculated from a shift position different from that of the first hash value.

In some embodiments, a maximum number of shifts at the first length may be different from a maximum number of shifts at the second length.

Another implementation of the present disclosure is a method for deduplicating data. The method includes: scanning, by one or more processors, extents for duplicate data chunks; calculating, by the one or more processors, hash values for the extents at different chunk lengths; emitting, by the one or more processors, the hash values at the different chunk lengths; identifying, by the one or more processors, matching ones of the hash values; and selecting, by the one or more processors, one or more candidates from among the matching ones of the hash values for dedup.

In some embodiments, the scanning of the extents may include: scanning, by the one or more processors, the extents over a first length; and scanning, by the one or more processors, the extents over a second length different from the first length.

In some embodiments, the calculating of the hash values may include: calculating, by the one or more processors, a first hash value at the first length; and calculating, by the one or more processors, a second hash value at the second length.

In some embodiments, the second hash value may be a duplicate of a portion of the first hash value, and the second hash value may be referenced by an extent family of the first hash value including an offset reference identifying a starting position and a length of the portion within the first hash value that may be the duplicate of the second hash value.

In some embodiments, the calculating of the second hash value at the second length may include skipping, by the one or more processors, ones of the one or more candidates that match the first hash value, and calculating, by the one or more processors, the second hash value on remaining ones of the data chunks at the second length.

In some embodiments, the second hash value may be calculated from a shift position different from that of the first hash value.

In some embodiments, a maximum number of shifts at the first length may be different from a maximum number of shifts at the second length.

Another implementation of the present disclosure is one or more non-transitory computer readable media containing program instructions. When executed by one or more processors, the instructions cause the one or more processors to perform the operations including: scanning extents for duplicate data chunks; calculating hash values for the extents at different chunk lengths; emitting the hash values at the different chunk lengths; identifying matching ones of the hash values; and selecting one or more candidates from among the matching ones of the hash values for dedup.

In some embodiments, the scanning of the extents may include: scanning the extents over a first length; and scanning the extents over a second length different from the first length.

In some embodiments, the calculating of the hash values may include: calculating a first hash value at the first length; and calculating a second hash value at the second length.

In some embodiments, the second hash value may be a duplicate of a portion of the first hash value, and the second hash value may be referenced by an extent family of the first hash value including an offset reference identifying a starting position and a length of the portion within the first hash value that may be the duplicate of the second hash value.

In some embodiments, the calculating of the second hash value at the second length may include skipping ones of the one or more candidates that match the first hash value, and calculating the second hash value on remaining ones of the data chunks at the second length.

In some embodiments, the second hash value may be calculated from a shift position different from that of the first hash value.

In some embodiments, a maximum number of shifts at the first length may be different from a maximum number of shifts at the second length.

The foregoing summary is illustrative only and is not intended to be in any way limiting. In addition to the illustrative aspects, embodiments, and features described above, further aspects, embodiments, and features will become apparent by reference to the following drawings and the detailed description.

BRIEF DESCRIPTION OF THE DRAWINGS

The above and other aspects and features of the present disclosure will become more apparent to those skilled in the art from the following detailed description of the example embodiments with reference to the accompanying drawings, in which:

FIG. 4 is a table showing simulation results of level scans at various shift values, according to some embodiments;

DETAILED DESCRIPTION

Figure 1:
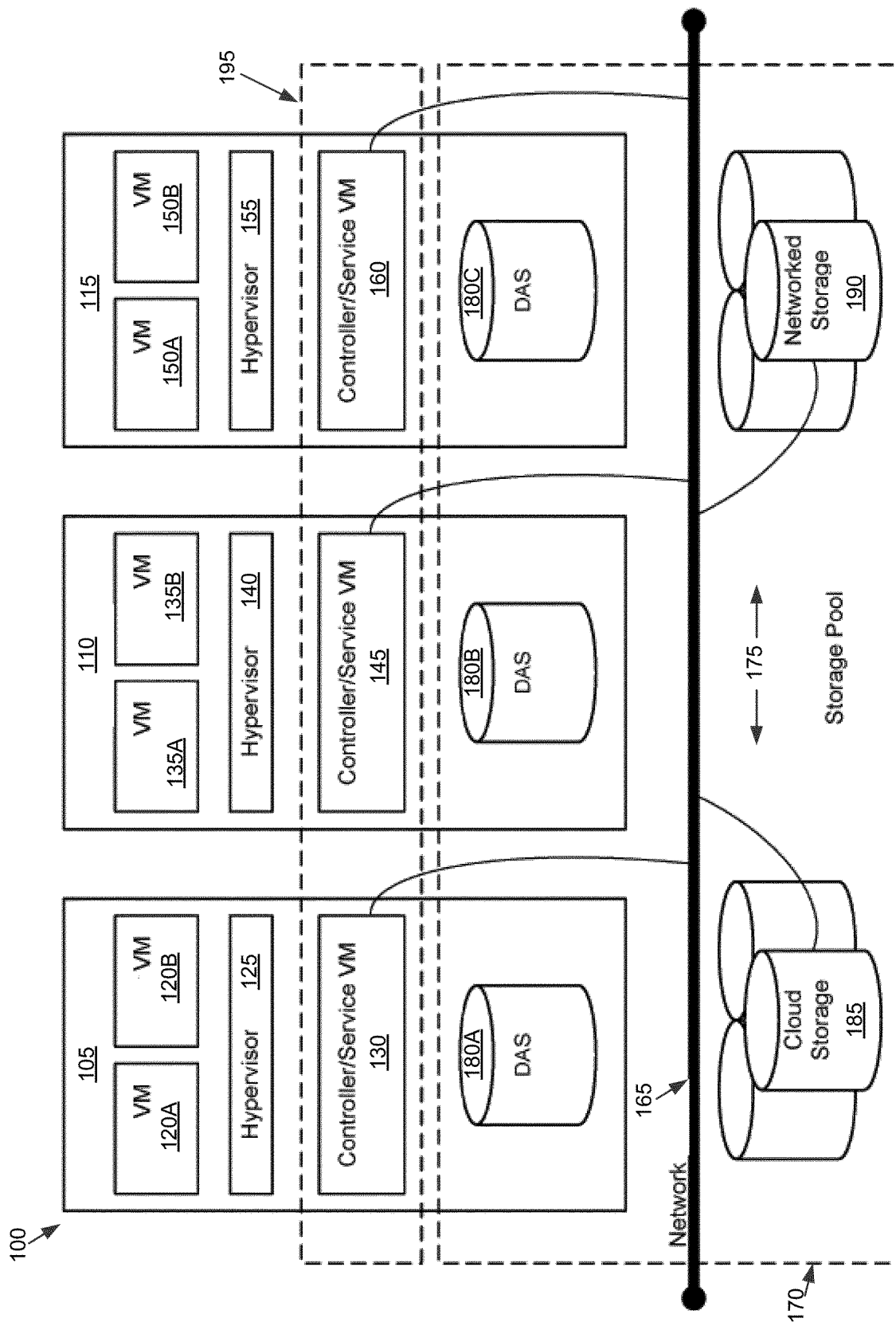
FIG. 1 is a block diagram of a virtual computing system, according to some embodiments.

Hereinafter, example embodiments will be described in more detail with reference to the accompanying drawings. In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented here. It will be readily understood that the aspects of the present disclosure, as generally described herein, and illustrated in the figures, can be arranged, substituted, combined, and designed in a wide variety of different configurations, all of which are explicitly contemplated and make part of this disclosure.

In some deduplication systems, dedup chunks may be at a smaller fixed length in order to identify duplicate chunks of data at the smaller fixed length. For example, if 1 MB of data is deduped at a fixed length of 16 KB, the 1 MB of data will be extentified into 64 dedup extents, each at a size of 16 KB. Thus, the 64 dedup extents would each require a reference entry in the metadata map. However, some of the data chunks could have been deduped at a much larger chunk level, but instead, are still deduped into the smaller 16 KB fixed length. For example, if the 1 MB of data could be deduped at a length of 512 KB, then the 1 MB of data could have been extentified into only 2 dedup extents, each at a size of 512 KB. Thus, in this example, the number of references in the metadata map for the 1 MB of data could have been reduced (e.g., from 64 entries to only 2 entries). Reducing the metadata may reduce processing overhead of the data (e.g., in a MapReduce process), thus improving processing times. Further, in addition to causing more metadata, deduplicating data at a smaller fixed length may generate more fragmented data. For example, deduping data at a smaller fixed length may cause some data chunks to be unnecessarily deduped (which may also lead to increased metadata), for example, because these data chunks have a reference count of only 1. In this case, these unnecessarily deduped data chunks may cause fragmentation, which may lead to reduced storage capacity and/or degraded performance.

According to one or more example embodiments of the present disclosure, metadata and fragmented data may be reduced. For example, according to various embodiments of the present disclosure, duplicate data chunks may be identified and selected for dedup at various chunk lengths. For example, extents may be scanned at various lengths to identify larger chunks of duplicate data. In some embodiments, the extents may be scanned at one or more shift positions. Thus, data having a slight skew may still be identified as duplicate data. In some embodiments, smaller chunks of data may be represented by an Extent Family with an offset reference, so that the smaller chunks of data do not need to be separately represented in the metadata map or even stored. Thus, more data may be deduped, including data that normally would not have been deduped (e.g., because of a small count value), while increasing storage capacity without increasing metadata. Accordingly, in various embodiments, storage capacity and/or performance may be improved by reducing metadata and fragmented data.

Referring now to FIG. 1, a virtual computing system 100 is shown, in accordance with some embodiments of the present disclosure. The virtual computing system 100 includes a plurality of nodes, such as a first node 105, a second node 110, and a third node 115. The first node 105 includes user virtual machines ("user VMs") 120A and 120B (collectively referred to herein as "user VMs 120"), a hypervisor 125 configured to create and run the user VMs, and a controller/service VM 130 configured to manage, route, and otherwise handle workflow requests between the various nodes of the virtual computing system 100. Similarly, the second node 110 includes user VMs 135A and 135B (collectively referred to herein as "user VMs 135"), a hypervisor 140, and a controller/service VM 145, and the third node 115 includes user VMs 150A and 150B (collectively referred to herein as "user VMs 150"), a hypervisor 155, and a controller/service VM 160. The controller/service VM 130 of the first node 105, the controller/service VM 145 of the second node 110, and the controller/service VM 160 of the third node 115 are all connected to a network 165 to facilitate communication between the first node, the second node, and the third node. Although not shown, in some embodiments, the hypervisor 125, the hypervisor 140, and the hypervisor 155 may also be connected to the network 165.

The virtual computing system 100 also includes a storage pool 170. The storage pool 170 may include network-attached storage 175 and direct-attached storage 180A, 180B, and 180C. The network-attached storage 175 may be accessible via the network 165 and, in some embodiments, may include cloud storage 185, as well as local storage area network 190. In contrast to the network-attached storage 175, which is accessible via the network 165, the direct-attached storage 180A, 180B, and 180C may include storage components that are provided within each of the first node 105, the second node 110, and the third node 115, respectively, such that each of the first, second, and third nodes may access its respective direct-attached storage without having to access the network 165. Thus, the network-attached storage 175 and/or the direct-attached storage 180A, 180B, and 180C may include non-transient data storage mediums (e.g., local disc or flash-based hard drives, local network servers, and the like) and/or remote data storage facilities (e.g., cloud servers) for retrievably storing a variety of information.

Further, virtual disks ("vDisks") may be structured from the storage resources in the network-attached storage 175 and/or the direct-attached storage 180A, 180B, and 180C. As used herein, the term "vDisk" refers to the virtualized storage abstraction that is exposed by the controller/service VM 130, 145, and 160 for use by the user VMs 120, 135, and 150. In some embodiments, the vDisk(s) may be mounted on the user VMs 120, 135, and 150 and an interface to the vDisk(s) may be exposed via a protocol such as iSCSI ("internet small computer system interface"), NFS ("network file system"), or any other appropriate protocol. These storage disks may be implemented by software running inside the controller/service VMs 130, 145, and 160. Thus, to the user VMs 120, 135, and 150, the controller/service VMs 130, 145, and 160 appear to be exporting a clustered storage appliance that contains storage disks.

It is to be understood that only certain components of the virtual computing system 100 are shown in FIG. 1. Nevertheless, several other components that are commonly provided or desired in a virtual computing system are contemplated and considered within the scope of the present disclosure. Similarly, although three of the plurality of nodes (e.g., the first node 105, the second node 110, and the third node 115) are shown in the virtual computing system 100, in other embodiments, greater than or fewer than three nodes may be used. Likewise, although only two of the user VMs (e.g., the user VMs 120, the user VMs 135, and the user VMs 150) are shown on each of the first node 105, the second node 110, and the third node 115, in other embodiments, the number of the user VMs on each of the first, second, and third nodes may vary to include either a single user VM or more than two user VMs. Further, the first node 105, the second node 110, and the third node 115 need not always have the same number of the user VMs (e.g., the user VMs 120, the user VMs 135, and the user VMs 150). Additionally, more than a single instance of the hypervisor (e.g., the hypervisor 125, the hypervisor 140, and the hypervisor 155) and/or the controller/service VM (e.g., the controller/service VM 130, the controller/service VM 145, and the controller/service VM 160) may be provided on the first node 105, the second node 110, and/or the third node 115.

In some embodiments, each of the first node 105, the second node 110, and the third node 115 may be a hardware device, such as a server. For example, in some embodiments, one or more of the first node 105, the second node 110, and the third node 115 may be an NX-1000 server, NX-3000 server, NX-6000 server, NX-8000 server, etc. provided by Nutanix, Inc. or server computers from Dell, Inc., Lenovo Group Ltd. or Lenovo PC International, Cisco Systems, Inc., etc. In other embodiments, one or more of the first node 105, the second node 110, or the third node 115 may be another type of hardware device, such as a personal computer, an input/output or peripheral unit such as a printer, or any type of device that is suitable for use as a node within the virtual computing system 100. In some embodiments, the virtual computing system 100 may be part of a data center.

Each of the first node 105, the second node 110, and the third node 115 may also be configured to communicate and share resources with each other via the network 165. For example, in some embodiments, the first node 105, the second node 110, and the third node 115 may communicate and share resources with each other via the controller/service VM 130, the controller/service VM 145, and the controller/service VM 160, and/or the hypervisor 125, the hypervisor 140, and the hypervisor 155. One or more of the first node 105, the second node 110, and the third node 115 may also be organized in a variety of network topologies, and may be termed as a "host" or "host machine."

Also, although not shown, one or more of the first node 105, the second node 110, and the third node 115 may include one or more processing units configured to execute instructions. The instructions may be carried out by a special purpose computer, logic circuits, or hardware circuits of the first node 105, the second node 110, and the third node 115. The processing units may be implemented in hardware, firmware, software, or any combination thereof. The term "execution" is, for example, the process of running an application or the carrying out of the operation called for by an instruction. The instructions may be written using one or more programming language, scripting language, assembly language, etc. The processing units, thus, execute an instruction, meaning that they perform the operations called for by that instruction.

The processing units may be operably coupled to the storage pool 170, as well as with other elements of the respective first node 105, the second node 110, and the third node 115 to receive, send, and process information, and to control the operations of the underlying first, second, or third node. The processing units may retrieve a set of instructions from the storage pool 170, such as, from a permanent memory device like a read only memory (ROM) device and copy the instructions in an executable form to a temporary memory device that is generally some form of random access memory (RAM). The ROM and RAM may both be part of the storage pool 170, or in some embodiments, may be separately provisioned from the storage pool. Further, the processing units may include a single stand-alone processing unit, or a plurality of processing units that use the same or different processing technology.

With respect to the storage pool 170 and particularly with respect to the direct-attached storage 180A, 180B, and 180C, each of the direct-attached storage may include a variety of types of memory devices. For example, in some embodiments, one or more of the direct-attached storage 180A, 180B, and 180C may include, but is not limited to, any type of RAM, ROM, flash memory, magnetic storage devices (e.g., hard disk, floppy disk, magnetic strips, etc.), optical disks (e.g., compact disk (CD), digital versatile disk (DVD), etc.), smart cards, solid state devices, etc. Likewise, the network-attached storage 175 may include any of a variety of network accessible storage (e.g., the cloud storage 185, the local storage area network 190, etc.) that is suitable for use within the virtual computing system 100 and accessible via the network 165. The storage pool 170 including the network-attached storage 175 and the direct-attached storage 180A, 180B, and 180C may together form a distributed storage system configured to be accessed by each of the first node 105, the second node 110, and the third node 115 via the network 165, the controller/service VM 130, the controller/service VM 145, and the controller/service VM 160, and/or the hypervisor 125, the hypervisor 140, and the hypervisor 155. In some embodiments, the various storage components in the storage pool 170 may be configured as virtual disks for access by the user VMs 120, the user VMs 135, and the user VMs 150.

Each of the user VMs 120, the user VMs 135, and the user VMs 150 is a software-based implementation of a computing machine in the virtual computing system 100. The user VMs 120, the user VMs 135, and the user VMs 150 emulate the functionality of a physical computer. Specifically, the hardware resources, such as processing unit, memory, storage, etc., of the underlying computer (e.g., the first node 105, the second node 110, and the third node 115) are virtualized or transformed by the respective hypervisor 125, the hypervisor 140, and the hypervisor 155 into the underlying support for each of the user VMs 120, the user VMs 135, and the user VMs 150 that may run its own operating system and applications on the underlying physical resources just like a real computer. By encapsulating an entire machine, including CPU, memory, operating system, storage devices, and network devices, the user VMs 120, the user VMs 135, and the user VMs 150 are compatible with most standard operating systems (e.g. Windows, Linux, etc.), applications, and device drivers. Thus, each of the hypervisor 125, the hypervisor 140, and the hypervisor 155 is a virtual machine monitor that allows a single physical server computer (e.g., the first node 105, the second node 110, third node 115) to run multiple instances of the user VMs 120, the user VMs 135, and the user VMs 150, with each user VM sharing the resources of that one physical server computer, potentially across multiple environments. By running the user VMs 120, the user VMs 135, and the user VMs 150 on each of the first node 105, the second node 110, and the third node 115, respectively, multiple workloads and multiple operating systems may be run on a single piece of underlying hardware computer (e.g., the first node, the second node, and the third node) to increase resource utilization and manage workflow.

The user VMs 120, the user VMs 135, and the user VMs 150 are controlled and managed by their respective instance of the controller/service VM 130, the controller/service VM 145, and the controller/service VM 160. The controller/service VM 130, the controller/service VM 145, and the controller/service VM 160 are configured to communicate with each other via the network 165 to form a distributed system 195. Each of the controller/service VM 130, the controller/service VM 145, and the controller/service VM 160 may also include a management system configured to manage various tasks and operations within the virtual computing system 100. For example, as discussed below, in some embodiments, the management system of the controller/service VM 130, the controller/service VM 145, and the controller/service VM 160 may facilitate conversion of the hypervisor 125, the hypervisor 140, and the hypervisor 155 from a first type to a second type. The management system may also manage the reconfiguration of the other components due to the conversion of the hypervisor.

The hypervisor 125, the hypervisor 140, and the hypervisor 155 of the first node 105, the second node 110, and the third node 115, respectively, may be configured to run virtualization software, such as, ESXi from VMWare, AHV from Nutanix, Inc., XenServer from Citrix Systems, Inc., etc., for running the user VMs 120, the user VMs 135, and the user VMs 150, respectively, and for managing the interactions between the user VMs and the underlying hardware of the first node 105, the second node 110, and the third node 115. Each of the controller/service VM 130, the controller/service VM 145, the controller/service VM 160, the hypervisor 125, the hypervisor 140, and the hypervisor 155 may be configured as suitable for use within the virtual computing system 100.

The network 165 may include any of a variety of wired or wireless network channels that may be suitable for use within the virtual computing system 100. For example, in some embodiments, the network 165 may include wired connections, such as an Ethernet connection, one or more twisted pair wires, coaxial cables, fiber optic cables, etc. In other embodiments, the network 165 may include wireless connections, such as microwaves, infrared waves, radio waves, spread spectrum technologies, satellites, etc. The network 165 may also be configured to communicate with another device using cellular networks, local area networks, wide area networks, the Internet, etc. In some embodiments, the network 165 may include a combination of wired and wireless communications.

Referring still to FIG. 1, in some embodiments, one of the first node 105, the second node 110, or the third node 115 may be configured as a leader node. The leader node may be configured to monitor and handle requests from other nodes in the virtual computing system 100. The leader node may also be configured to receive and handle requests (e.g., user requests) from outside of the virtual computing system 100. If the leader node fails, another leader node may be designated. Furthermore, one or more of the first node 105, the second node 110, and the third node 115 may be combined together to form a network cluster (also referred to herein as simply "cluster.") Generally, all of the nodes (e.g., the first node 105, the second node 110, and the third node 115) in the virtual computing system 100 may be divided into one or more clusters. One or more components of the storage pool 170 may be part of the cluster as well. For example, the virtual computing system 100 as shown in FIG. 1 may form one cluster in some embodiments. Multiple clusters may exist within a given virtual computing system (e.g., the virtual computing system 100). The user VMs 120, the user VMs 135, and the user VMs 150 that are part of a cluster may be configured to share resources with each other. In some embodiments, multiple clusters may share resources with one another.

Further, in some embodiments, although not shown, the virtual computing system 100 may include a virtual computing management system configured to manage and control the operation of the various clusters in the virtual computing system. In some embodiments, the virtual computing management system may be configured to communicate with the local management systems on each of the controller/service VM 130, the controller/service VM 145, the controller/service VM 160 for controlling the various clusters.

Figure 2:
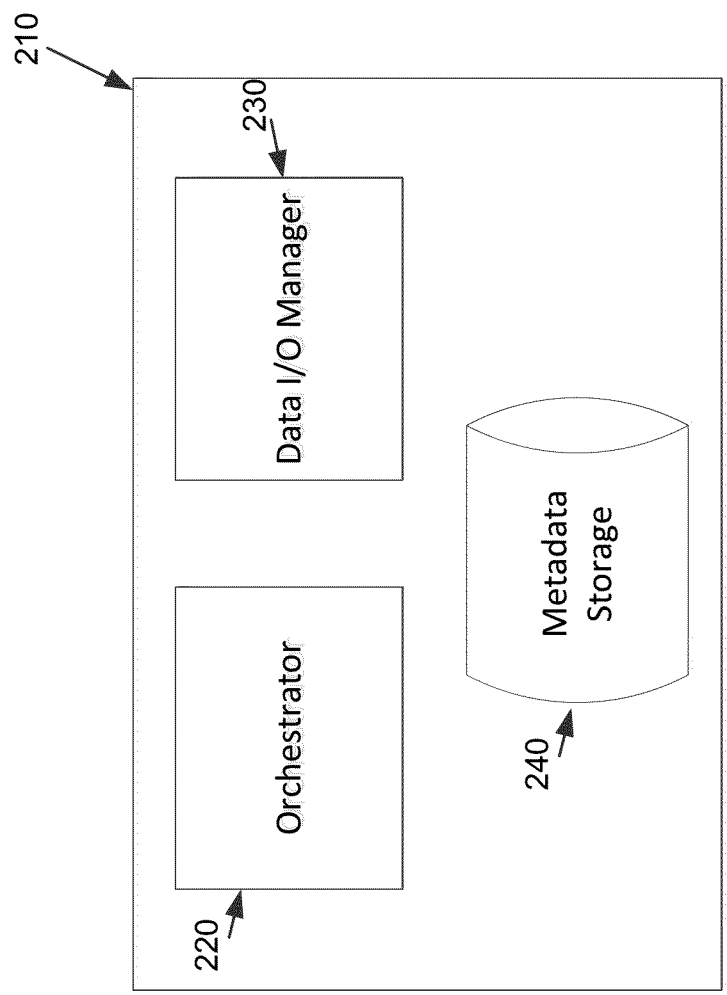
FIG. 2 is a block diagram of a controller/service virtual machine (VM) in greater detail, according to some embodiments.

FIG. 2 is a block diagram of a controller/service virtual machine (VM) in greater detail, according to some embodiments. In some embodiments, each of the controller/service VMs 130, 145, and 160 shown in FIG. 1 may include the same or substantially the same components as those of the controller/service VM 210. However, the present disclosure is not limited thereto, for example, the components of the controller/service VM 210 in FIG. 2 may be distributed from among the controller/service VMs 130, 145, and 160 and/or from among the other components shown in FIG. 1.

Referring to FIG. 2 the controller/service VM 210 may include an orchestrator 220, a data input/output (I/O) manager 230, and metadata storage 240. In some embodiments, the metadata storage 240 may be an internal storage device of the controller/service VM 210 or may be a part of the storage pool 170 shown in FIG. 1. Further, although a few components are shown as being included in the controller/service VM 210, other components that are commonly provided or desired in a virtual computing system are contemplated and considered within the scope of the present disclosure.

In some embodiments, the orchestrator 220 may be configured to manage and distribute tasks throughout the cluster, such as MapReduce cluster management/cleanup, disk balancing, scrubbing, etc. In various embodiments, the orchestrator 220 scans extents in the metadata table stored in the metadata storage 240 to identify duplicate data chunks within the extents. The orchestrator 220 selects dedup candidates from among the duplicate data chunks, and sends information about the selected dedup candidates to the data I/O manager 230 for deduplication.

The data I/O manager 230 may be responsible for all data management and I/O operations, and may be the main interface (e.g., via NFS, iSCSI, or SMB) with the hypervisor (e.g., the hypervisor 125, 140, or 155). In various embodiments, the data I/O manager may deduplicate actual data based on information about the dedup candidates selected by the orchestrator 220. In this case, the data I/O manager 230 may also update the metadata corresponding to the deduplicated data in the metadata storage 240.

Recursive Dedup

In some deduplication systems, dedup chunks may be at a fixed length (e.g., 16K). Thus, for example, when 1 MB of non-deduped data is selected for dedup, the data may be extentified into 64 dedup extents, each having a size of 16K. In addition, some of the data chunks may have duplicate data that could have been deduped at a much larger chunk level, but instead, are split into the smaller fixed 16K chunks. Further, in some file systems, data may be stored with a skew (e.g., an 8K skew), due to alignment when storing the data. In this case, data that could have been deduped may not be recognized as duplicate data. Accordingly, metadata and fragmented data may be increased, which may lead to degraded performance.

Figure 3:
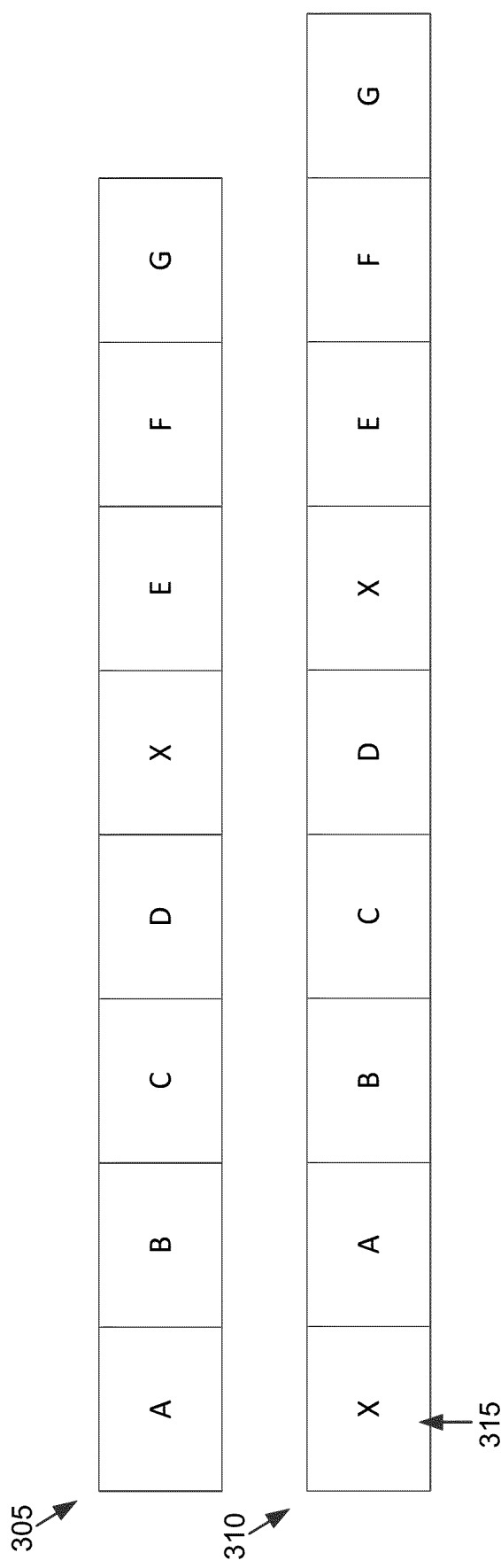
FIG. 3 is a graphical representation of a plurality of extents in a metadata table.

For example, FIG. 3 is a graphical representation of a plurality of extents in a metadata table. Referring to FIG. 3, the plurality of extents include a first extent 305 and a second extent 310. Each of the first and second extents 305 and 310 include a plurality of blocks A, B, C, D, E, F, G, and X that are arranged in a logically contiguous order. In some embodiments, each of the blocks A, B, C, D, E, F, G, and X represents a checksum of a data chunk (e.g., an 8K checksum), but the present disclosure is not limited thereto. For example, in other embodiments, the data chunks may be represented by any suitable function or algorithm (e.g., SHA1, SHA2, SHA3, and/or the like).

Referring to FIG. 3, the second extent 310 may include the same logically contiguous data chunks (e.g., ABCDXEFG) as that of the first extent 305, but with an 8K skew 315. Thus, because of the skew 315, dedup of the data at the fixed length of 16K results in a 0 dedup ratio between the first extent 305 and the second extent 310. For example, when deduping the data at the fixed length of 16K, a scan of the first extent 305 may emit hash values (e.g., SHA1, SHA2, SHA3, and/or the like) AB, CD, XE, and FG, while a scan of the second extent 310 may emit the hash values XA, BC, DX, EF, etc. Accordingly, because of the 8K skew 315, no matching hash values are emitted, and thus, the duplicate data may not be recognized.

According to various embodiments of the present disclosure, the data chunks may be deduped at various chunk lengths, and with multiple shifts. For example, the orchestrator 220 may select dedup candidates of the data chunks by scanning the extents at various levels (or orders), each having a different chunk length. For example, at a first level, the extents may be scanned over the largest length (e.g., 1 MB) to identify if there are any duplicate data chunks at this largest length. At a second level, the extents may be scanned over a smaller length (e.g., 512 KB) than that of the first level to identify if there are any duplicate data chunks at this smaller length. At a third level, the extents may be scanned over an even smaller length (e.g., 256 KB) than that of the second level to identify if there are any duplicate data chunks at this even smaller length, and so on and so forth.

Accordingly, still referring to FIG. 3, at the 64K level, scanning the first extent 305 will emit the hash value ABCDXEFG. Scanning the second extent 310 will emit the hash value XABCDXEFG. Further, scanning the second extent 310 at the 64K level with one shift will also emit the hash value ABCDXEFG. Accordingly, in this case, the 64K chunk{ABCDXEFG} in the second extent 310 may be recognized as a duplicate of the 64K chunk{ABCDXEFG} in the first extent 305, and thus, may be selected by the orchestrator 220 as a candidate for dedup.

Similarly, at the 32K level, scanning the first extent 305 with all shifts will emit the hash values ABCD, BCDX, CDXE, DXEF, XEFG, etc., and scanning the second extent 310 with all shifts will emit the hash values XABC, ABCD, BCDX, CDXE, DXEF, XEFG, etc. Accordingly, in this case, the 32K chunk{ABCD} and the 32K chunk {XEFG} in the second extent 310 may be recognized as a duplicate of the 32K chunk{ABCD} and the 32K chunk {XEFG} in the first extent 305, and thus, may be selected by the orchestrator 220 as candidates for dedup. The other duplicate chunks (e.g., BCDX, CDXE, and DXEF) may not be selected for dedup, because they overlap or have blocks in common with the 32K chunk{ABCD} and the 32K chunk {XEFG}.

Accordingly, in various embodiments, the extents may be scanned over various chunk lengths. The chunk length of each subsequent level scan may be smaller than those of the previous levels, and the chunk length of the last level may be the smallest length from among those of the previous levels. In some embodiments, the chunk length of each subsequent level may be decreased one block size at a time. For example, when each block is represented by an 8K checksum, the length of each subsequent level may be reduced by 8K (e.g., 32K, 24K, 16K, and 8K). In some embodiments, the chunk length of each subsequent level may be decreased by about half (e.g., 1M, 512K, 256K, 128K, etc.). In some embodiments, the chunk lengths of the levels at the higher orders (e.g., 1M, 512K, 256K, 128K, etc.) may be decreased by about half for each subsequent level, and the chunk lengths of the levels at the lower orders (e.g., 32K, 24K, 16K, etc,) may be decreased by one block size (e.g., 8K) for each subsequent level. However, the present disclosure is not limited thereto, and the chunk length of each subsequent level may be decreased by any suitable length as experimentally determined. Further, more scanning levels may increase a processing time of the overall dedup process, and scans at lower orders may emit more key-value pairs, which may increase overhead (e.g., MapReduce workload). Accordingly, in some embodiments, the chunk length of each subsequent level may be decreased by about half, and the number of scans at lower orders may be reduced or some lower order scans may be omitted.

In addition, the length of the last level (or the lowest order) to be scanned may depend on the type of storage device. For example, for a hard disk drive (HDD) storage device, 128 KB may be sufficient as the last level, whereas for a solid state drive (SSD) storage device, 16 KB or even 8 KB may be the last level. However, the present disclosure is not limited thereto, and the last level (or the number of levels to be scanned) may be dynamically tuned and/or experimentally determined.

In some embodiments, the results of the scan of a previous (e.g., higher order) level may affect the scan of a subsequent (e.g., lower order) level. For example, the chunks selected for dedup during a previous level scan may be skipped in a subsequent level scan, and the hash values (e.g., SHA1) may be calculated or emitted for only the remaining chunks. Thus, returning to the example discussed above with reference to FIG. 3, when the 64K chunk{ABCDXEFG} in the second extent 310 is selected as a candidate for dedup during the 64K level scan, there would be no 32K chunks emitted during a subsequent 32K level scan.

In some embodiments, the number of shifts for each level scan may be user defined or experimentally determined. Generally, the smaller the shift value the better the granularity, and the more shifts applied the better the dedup ratio. However, the more shifts applied, the more taxing it may become on the orchestrator 220 to process larger amounts of emitted data. Accordingly, in some embodiments, the shift value may be set as the smallest shift value, and the amount of data emitted may be controlled by setting the maximum number of shifts for each level. In some embodiments, the smallest shift value may be calculated based on the size of one block. For example, when each of the blocks represent an 8k checksum and without analyzing the real data for computing a single hash value (e.g., SHA1), the smallest shift value may be set to 8k. Accordingly, in some embodiments, the smallest shift value may correspond to the size of one block.

Still referring to FIG. 3, as discussed above, a 32K level scan of the second extent 310 with all shifts results in the hash values XABC, ABCD, BCDX, CDXE, DXEF, and XEFG, being emitted. According to some embodiments, the number of hash values that are emitted may be controlled by setting a maximum number of shifts for each level of the scans. For example, the maximum number of shifts for a given level may be set with the following schema:

```
If MAX_SHIFTS == 2 && Level == 32K
    Emit(
        {X, A, B, C}, {D, X, E, F}    // No Shift
        {A, B, C, D}, {X, E, F, G}    // One Shift
        {B, C, D, X}                  // Two Shifts
    )
``` where MAX_SHIFTS refers to the maximum number of shifts applied and Level refers to the length of the data chunk to be scanned for the corresponding level. In this case, "no shift" results in the hash values {X, A, B, C} and {D, X, E, F} being emitted, "one shift" results in the hash values {A, B, C, D} and {X, E, F, G} being emitted, and "two shifts" result in the hash value {B,C,D,X} being emitted.

For example, the following table illustrates the number of hash values (e.g., SHA1s) emitted during each of the level scans for a 1 MB extent:

|  | # of SHA1 | | | | | | |
| --- | --- | --- | --- | --- | --- | --- | --- |
|  | 1024 K | 512 K | 256 K | 128 K | 64 K | 32 K | 16 K |
| No Shifts | 1 | 2 | 4 | 8 | 16 | 32 | 64 |
| One Shift | 1 | 3 | 7 | 15 | 31 | 63 | 127 |
| All Shifts | 1 | 65 | 97 | 113 | 121 | 125 | 127 | where the above table shows that the more number of shifts at each level results in more hash values being emitted (except for the 1024K level which has the same length as the 1 MB extent). Further, for each shift value, the lower order levels emit more hash values than those of the higher order levels. Accordingly, by controlling the maximum number of shifts, the number of emitted hash values for a particular level scan may be controlled.

FIG. 4 is a table showing simulation results of level scans at various shift values, according to some embodiments. For the simulation, the same file ("ubuntu-14.04.5-server-amd64.iso") was downloaded and installed twice, but with different settings. The first install utilized vdi as the underlying storage format, and the second install utilized vmdk as the underlying format. Further, the two installs were configured with different settings and software in order to generate test data having similar images, but not too similar as to have large chunks of the same data.

Referring to FIG. 4, it can be seen that a good dedup ratio can be achieved at higher order scans. For example, more than 66% of dedupable data can be detected at the 128K level scan and higher. Further, most of the data can be deduped at the 32K level scan or higher. While there are some left over chunks at the 16K level scan, the left over chunks may be ignored when considering the dedup ratio and the potential degraded performance caused by fragmentation. In addition, at higher order scans, there is a large difference of dedup savings between "all shifts" and "one shift," but in the lower order scans, the difference is small or negligible.

Referring to the zeroShift(baseline) at the 16K level scan, at least 203712 new extents will be created. When compared to the Levels Merged (Start from 1024 KB)(all shifts), there is approximately the same amount of total savings, but only about 88304 new extents will be created. That is, only about a third of the metadata is generated when compared to the 16K baseline example.

Accordingly, in some embodiments, the maximum number of shifts may be set differently for different level scans. For example, at higher order level scans (e.g., 1 MB, 512K, and 256K) the maximum number of shifts may be set to a value greater (e.g., all shifts) than those of the lower order level scans. In this case, during the higher order level scans, larger chunks of data may be selected for dedup resulting in less metadata being generated. Then, at lower order level scans (e.g., 128K, 64K, and 32K), the maximum number of shifts may be set to a lower value (e.g., one shift) than those of the higher order scans. Further, at the lowest order scan (e.g., 16K), the maximum number of shifts may be set to an even lower value (e.g., zero shift). In this case, because a lot of the data has already been selected for dedup during the higher order scans, and because the lower order scans already have relatively finer granularity, scanning with all shifts at the lower orders may not amount to much more savings. However, the present invention is not limited thereto, and some of the levels may be skipped or omitted. Further, the maximum number of shifts per level may be the same for each level, experimentally determined, and/or device dependent. For example, for non-SSD devices (e.g., an HDD device), the last level scan may be the 128 KB level, and each of the level scans may be set with the same shift value (e.g., all shifts).

Figure 5:
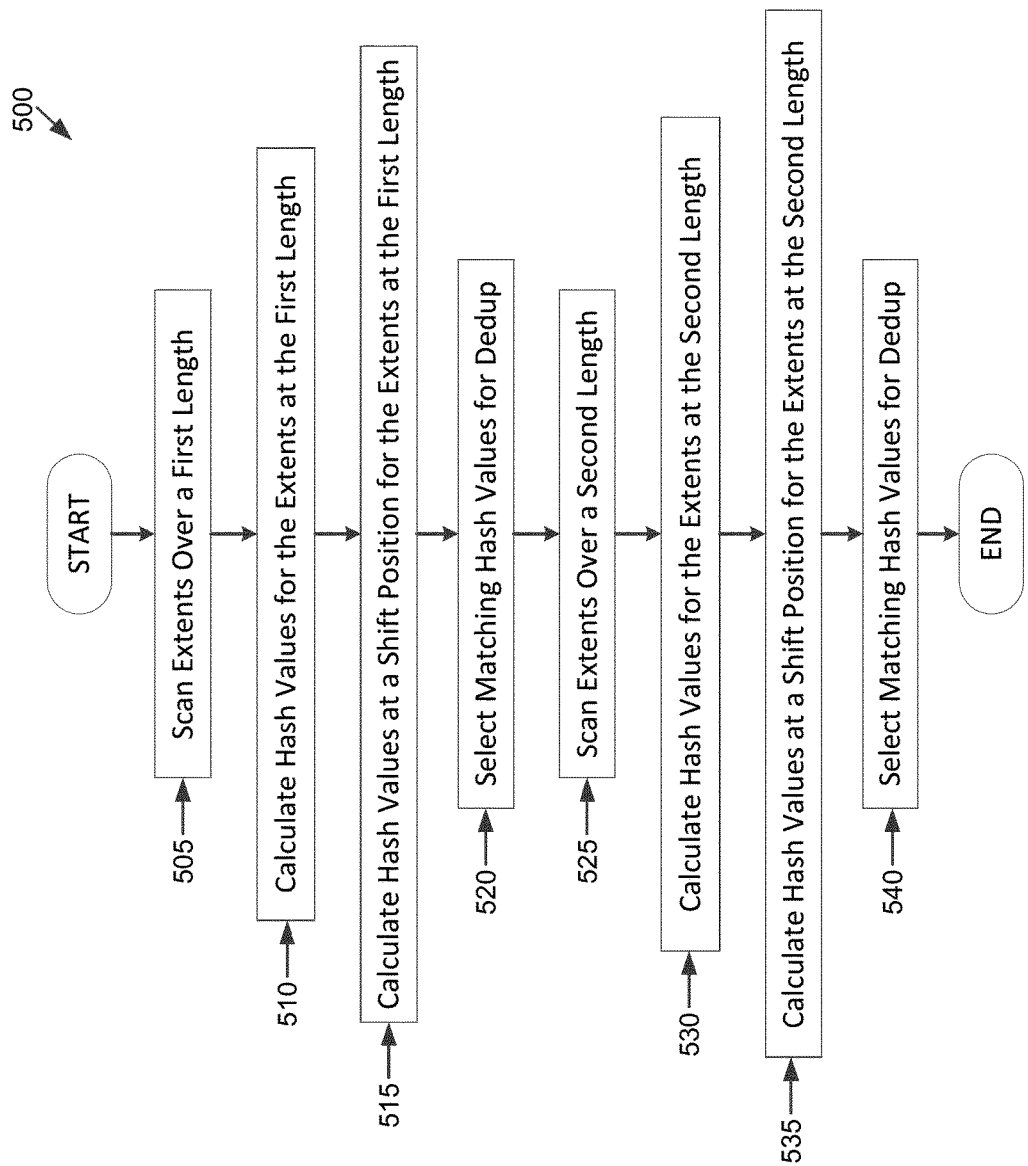
FIG. 5 is a flow diagram of a method for selecting dedup candidates, according to some embodiments.

FIG. 5 is a flow diagram of a method for selecting dedup candidates, according to some embodiments. Additional, fewer, or different operations may be performed depending on the implementation. Referring to FIG. 5, the method starts, and the extents in the metadata table are scanned (e.g., by the orchestrator 220) over a first chunk length at block 505. Hash values (e.g., SHA1) are calculated for the extents at the first chunk length at block 510. Further, hash values are calculated at one or more shift positions for the extents at the first chunk length at block 515. The hash values are compared for matches, and the matching hash values are selected as dedup candidates at block 520. In some embodiments, the matching hash values may be deduped (e.g., by the data I/O manager 230) prior to the second level scan at block 525, but the present disclosure is not limited thereto.

The extents are scanned (e.g., by the orchestrator 220) over a second chunk length at block 525. The second chunk length may be smaller than the first chunk length. Hash values (e.g., SHA1) are calculated for the extents at the second chunk length at block 530. In some embodiments, the chunks that were selected as dedup candidates at block 520 (or deduped by the data I/O manager 23) may be skipped, and the hash values may be calculated for the remaining chunks at the second chunk length at block 530. Further, hash values are calculated at one or more shift positions for the extents at the second chunk length at block 535. In some embodiments, the chunks that were selected as dedup candidates at block 520 (or deduped by the data I/O manager 23) may be skipped, and the hash values may be calculated at one or more shift positions for the remaining chunks at the second chunk length at block 535. Further, in some embodiments, the number of shift positions at block 535 may be different from the number of shift positions at block 515. The hash values are compared for matches, and the matching hash values are selected as dedup candidates at block 540. The process may then continue by scanning the extents over a third chunk length smaller than the second chunk length, if any, or may end as shown in FIG. 5. In some embodiments, the matching hash values at block 540 may be deduped (e.g., by the data I/O manager 230) prior to the third level scan, if any, but the present disclosure is not limited thereto.

Extent Family, Offset Referenced Extent

Figure 6:
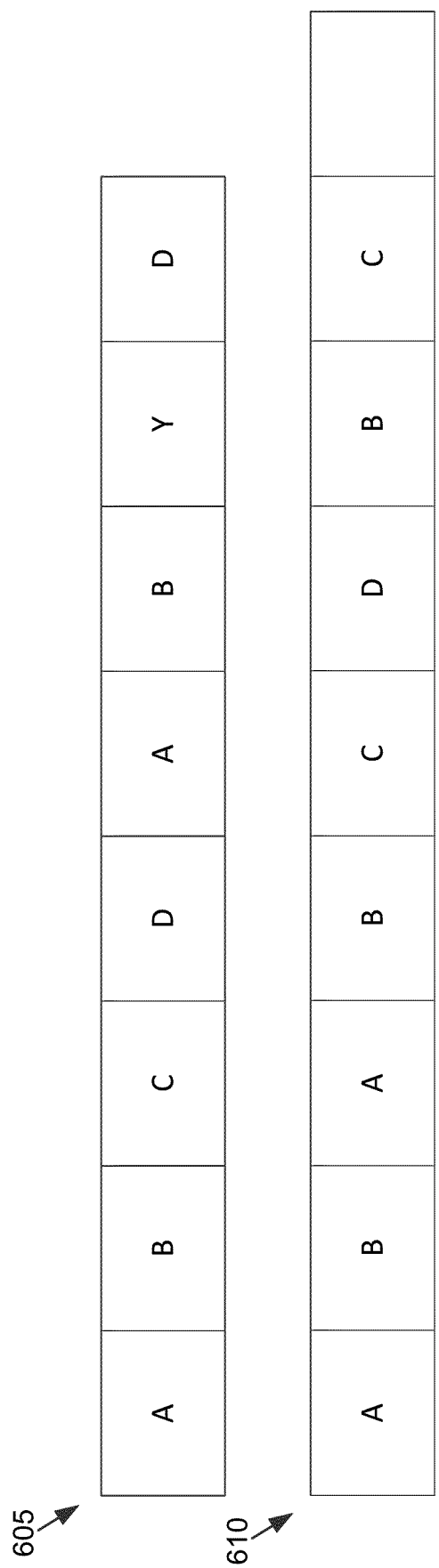
FIG. 6 is a graphical representation of a plurality of extents in a metadata table.

FIG. 6 is a graphical representation of a plurality of extents in a metadata table. Referring to FIG. 6, the plurality of extents include a third extent 605 and a fourth extent 610. Each of the third and fourth extents 605 and 610 include a plurality of blocks A, B, C, D, and Y that are arranged in a logically contiguous order. In some embodiments, each of the blocks A, B, C, D, and Y represents a checksum of a data chunk (e.g., an 8K checksum), but the present disclosure is not limited thereto. For example, in other embodiments, the data chunks may be represented by any suitable function or algorithm (e.g., SHA1, SHA2, SHA3, and/or the like).

In some embodiments, new dedup extents may be replaced with an offset into existing immutable extents. For example, referring to FIG. 6, the third extent 605 and the fourth extent 610 have a 32K chunk {A, B, C, D} and a 16K chunk {A, B} in common that would be selected for dedup (e.g., by the orchestrator 220). However, in some embodiments, instead of storing the hash value for the 16K chunk {A, B} (e.g., SHA1{A, B}) in the metadata, the hash value for {A, B} may be represented by the hash value for {A, B, C, D} with an offset reference as follows:

$$SHA1\{A,B,C,D\}[0,2*shift]$$

where SHA1{A, B, C, D} is the hash value for {A, B, C, D}, the first number (e.g., 0) in the offset reference is the starting position of the hash value for {A, B} within SHA1{A, B, C, D} (e.g., the starting position for A), and the second number*shift (e.g., 2*shift) is the length of the hash value for {A, B} (e.g., 2 blocks), which corresponds to the first two blocks in SHA1{A, B, C, D}. Accordingly, after dedup, the original data {A, B} may not need to be stored. For example, in some embodiments, extent{A, B, C, D} may serve as an Extent Family for {A, B, C, D}{A, B}{B, C}{C, D}. Thus, there is no need for an extent{A, B} in the metadata mapping (e.g., extent_id map).

Further, more data can be deduped using the Extent Family for extent{A, B, C, D}. For example, still referring to FIG. 6, after the higher order scans (e.g., 32K level scan), the 16K chunk {B, C} in the last two blocks of the fourth extent 610 would have no matching chunks to dedup (since {A, B, C, D} would have already been selected for dedup during the 32K level scan). However, using the Extent Family for extent{A, B, C, D}, the hash value for {B, C} (e.g., SHA1{B, C}) may be represented by, for example, SHA1{A, B, C, D}[1, 2*shift]. In this case, there is no need to store the actual data {B, C}, and there is also no need for an extent {B, C} in the metadata mapping after dedup. Accordingly, the dedup ratio may be improved while considerably reducing storage capacity and metadata. For example, if a 1 MB extent is deduped, this 1 MB immutable extent may serve as an Extent Family for up to 649 kinds of extents (e.g., the sum for each level scan of SHAW1s emitted under "all shift" in the above table). Thus, a considerable amount of actual data and metadata may be reduced by representing the 649 extents using the Extent Family for the 1 MB immutable extent.

Figure 7:
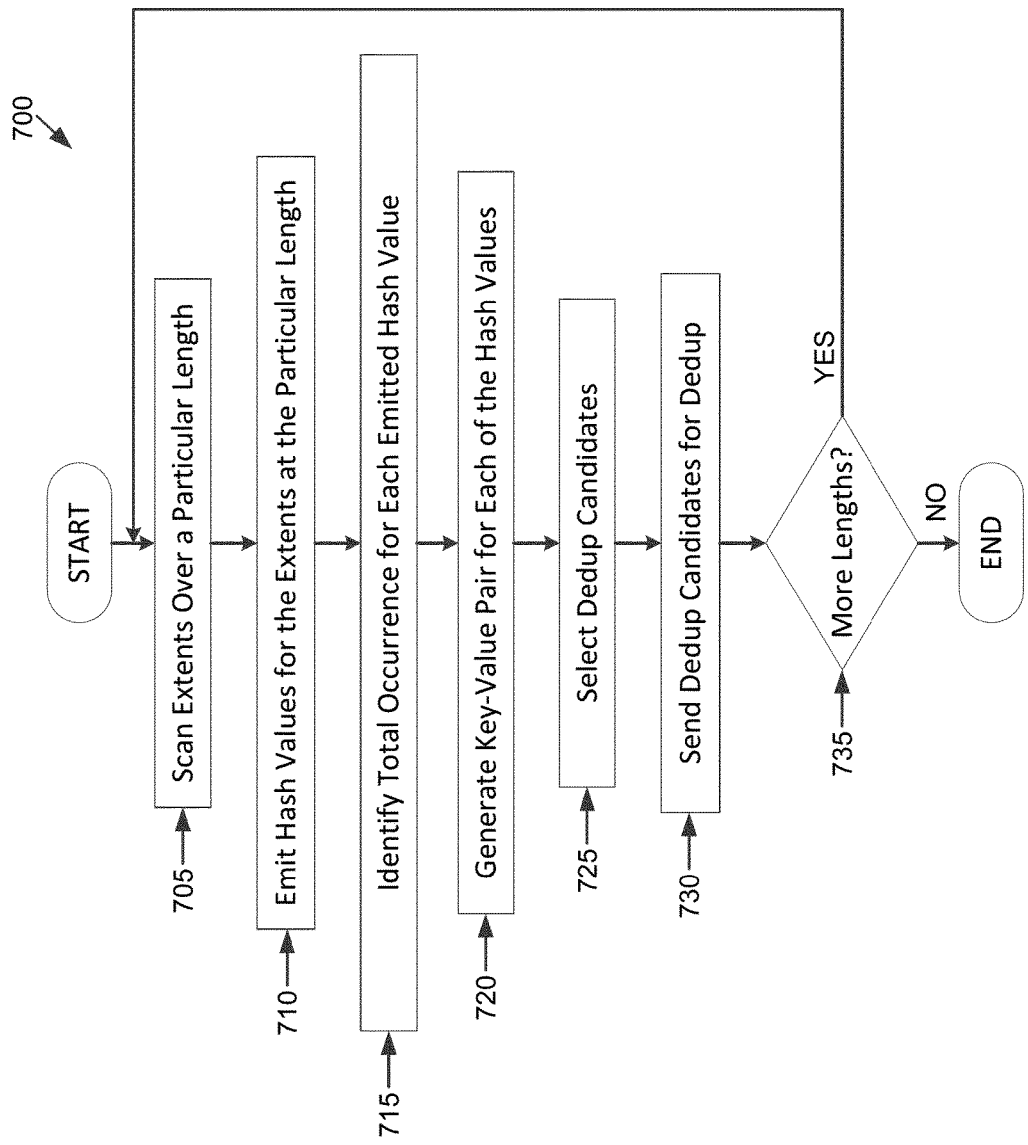
FIG. 7 is a flow diagram of a method for selecting dedup candidates, according to some embodiments.

FIG. 7 is a flow diagram of a method for selecting dedup candidates, according to some embodiments. Additional, fewer, or different operations may be performed depending on the implementation. Referring to FIG. 7, the method starts and the extents in the metadata table (e.g., ExtentGroupId map) are scanned (e.g., by the orchestrator 220) over a particular chunk length (e.g., during ExtentGroupId-MapTask) at block 705. Hash values (e.g., SHA1) are emitted for the extents at the particular chunk length (e.g., Key: Fingerprint, Value: egid, extent_id, length, offset) at block 710. In some embodiments, the hash values may be emitted for each of the extents regardless of whether the extent is a deduped extent or a non-deduped extent.

Using the hash values as a key (e.g., Fingerprint), the total occurrence for each of the hash values is identified (e.g., via FingerprintReduceTask) at block 715. Then, a key-value pair for each of the hash values is generated at block 720. For example, for each hash value, the key-value pair may be generated by using the corresponding extent information (e.g., extent_id from the ExtentGroupIdMapTask at block 710) as the key and chunk information (e.g., identified via FingerprintReduceTask at block 715) as the value (e.g., Key: extent_id, Value: count (>dedup_ratio), length, offset). Thus, every key-value pair includes the information to select a potential dedup candidate.

Accordingly, using the key-value pairs (e.g., during ExtentGroupIdOwnerReduceTask), the dedup candidates are selected at block 725. In some embodiments, the dedup candidates may be selected based on the chunks within each extent, which may be overlapping with each other. For example, the dedup candidates may be selected based on the occurrence count of the chunks, offset value, and/or overlap of the chunks with each other. In some embodiments, larger occurrence counts may be selected over smaller occurrence counts. If the occurrence count is the same, the chunks having no offset (e.g., no offset reference) may be selected, to avoid or reduce fragmentation. Otherwise, the chunks that do not overlap with each other may be selected for dedup.

In some embodiments, the selected dedup candidates are then sent (e.g., to data I/O manager 230) to be deduped at block 730. If there are additional levels to be scanned at block 735, then the process may proceed back to block 705 so that the extents may be scanned over the additional length(s). If there are no additional levels to be scanned at block 735, then the process may end.

Figure 8:
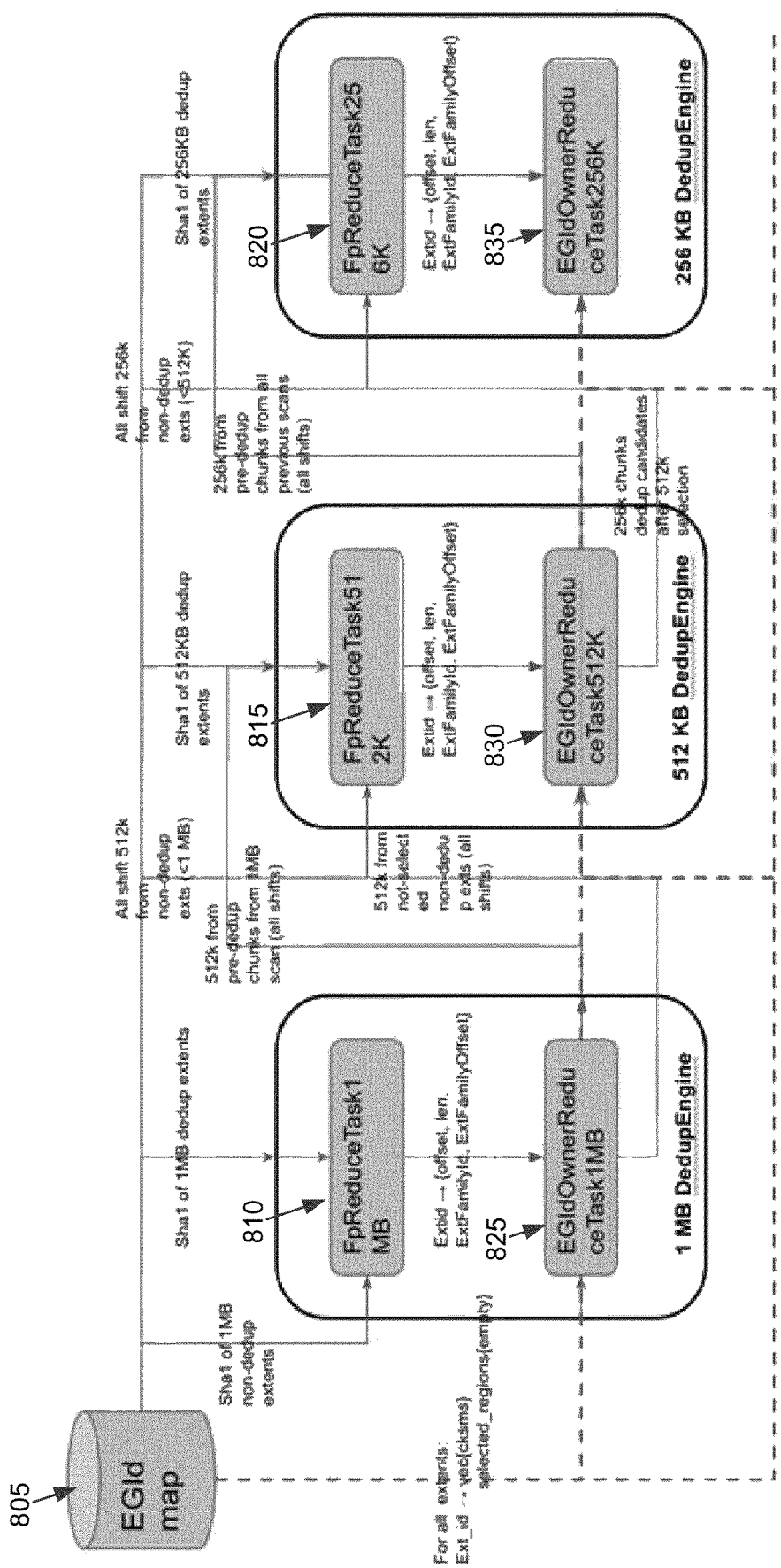
FIG. 8 is a flow diagram of a method for selecting dedup candidates, according to some embodiments.

FIG. 8 is a flow diagram of a method for selecting dedup candidates, according to some embodiments. Additional, fewer, or different operations may be performed depending on the implementation. One difference between the method in FIG. 8 from the method in FIG. 7 is that the method of FIG. 8 temporarily stores the dedup results of a previous level, for example, in a bitmap, to be used for a next level scan, without having to wait for the actual dedup (e.g., by the data I/O manager) results before starting the next level scan as is the case with the method of FIG. 7. For example, instead of waiting for the actual dedup results of a dedup candidate selected from a higher order scan, the dedup candidate may be indicated or marked as being "selected" in the bitmap. Then, in subsequent level scans, the bitmap will be used to skip or ignore the selected dedup candidates from the higher order scans, and the remaining non-selected data chunks will be scanned for candidate selection in the subsequent level scans. After all the scan are completed, and all the dedup candidates are marked in the bitmap, the data I/O manager may use the bitmap to execute the actual dedup operation. Accordingly, the method in FIG. 8 may produce faster results, generate less garbage for later cleanup, and provide more complete information about how a particular extent will be split (or deduped).

Referring to FIG. 8, the extents in the metadata table (e.g., EGId map or ExtentGroupId map) 805 are scanned (e.g., during ExtentGroupIdMapTask). Hash values (e.g., SHA1s) are emitted for the extents at various lengths as detected by the scan to respective dedup engines (e.g., 1 MB DedupEngine, 513 KB DedupEngine, 256 KB DedupEngine, etc.). For example, when non-deduped extents are scanned, hash values for extents with lengths equal to 1 MB are emitted to FpReduceTask1 MB (e.g., FingerprintReduceTask1 MB) 810, hash values for extents with lengths smaller than 1 MB but no less than 512 KB are emitted to FpReduceTask512K (e.g., FingerprintReduceTask512K) 815, hash values for extents with lengths smaller than 512 KB but no less than 256 KB are emitted to FpReduceTask256K (e.g., FingerprintReduceTask256K) 820, and so on and so forth.

Similarly, when deduped extents are scanned, hash values for extents with lengths of 1 MB are emitted to FpReduceTask1 MB (e.g., FingerprintReduceTask1 MB) 810, hash values for extents with lengths of 512 KB are emitted to FpReduceTask512K (e.g., FingerprintReduceTask512K) 815, hash values for extents with lengths of 256 KB are emitted to FpReduceTask256K (e.g., FingerprintReduceTask256K) 820, and so on and so forth.

Further, checksum layouts of each of the extents are emitted to corresponding EGIdOwnerReduceTasks (e.g., ExtentGroupIdOwnerReduceTasks). For example, the key-value pairs (e.g., ext_id, vec{checksum}) of 1 MB extents may be emitted to EGIdOwnerReduceTask1 MB 825, the key-value pairs of extents with lengths that are less than 1 MB but no less than 512 KB may be emitted to EGIdOwnerReduceTask512K 830, the key-value pairs of extents with lengths that are less than 512 KB but no less than 256 KB may be emitted to EGIdOwnerReduceTask256K 835, and so on and so forth. However, if 256 KB is the last level, then the vec{checksum} may be omitted from being emitted to EGIdOwnerReduceTask256K 835.

During the FpReduceTask1 MB 810, the hash values are matched. For each matched hash values, FpReduceTask1 MB 810 emits Key: ext_id, Value: count, offset, ExtentFamilyID, ExtentFamilyOffset. During the EGIdOwnerReduceTask1 MB 825, the information needed to select dedup candidates is known from the corresponding FpReduceTask1 MB 810. Accordingly, from the key-value pairs, a bitmap and a list of selected regions may be extracted. Then, using the key-value pairs, bitmaps, and selected region information, hash values (e.g., SHA1) for 512K chunks are emitted for the selected and non-selected 1 MB extents to FpReduceTask512K 830. Then, the checksum layout and bitmap for 1 MB extents are emitted to EGIdOwnerReduceTask512K. In this case, the bitmap indicates the candidate selection results of the previous level scans, without having to actually deduping the candidates (e.g., by data I/O manager 230) before performing subsequent level scans.

The method then repeats for each subsequent scans (e.g., the 512K scan, the 256K scan, etc.) until the last level scan is completed. Assuming that the 256K scan is the last level scan, after the EGIdOwnerReduceTask246K 853 is completed, the selected dedup candidates include all the information needed for dedup. For example, one of these selected dedup candidates may have the following schema:

```
Ext_id → {
        Bitmap bt;
        int64 egid;
        Region1 {
                int offset; // e.g., 8K
                int length; // e.g., 512K
                Sha1 extent_family_id;
                int extent_family_offset;
        };
        Region2 {
                int offset; // e.g., 520K
                int length; // e.g., 256K
        }
}
``` where such extents are sent to the data I/O manager 230 for dedup according to the listed region information.

In some embodiments, a total space saving number may be calculated after each scanning level. For example, by utilizing the process of FIG. 8, a total saving number from the higher level scans may be calculated. In this case, if the total saving number from the higher level scans is unsatisfactory, it may be assumed that the data itself is not suitable for dedup, and thus, dedup may be stopped. In some embodiments, a duduped ExtentFamily may be divided into smaller ExtentFamilys when its dedup count becomes 0 and its covered area falls below some threshold value. In some embodiments, consecutive dedup extents may be merged or further deduped. In some embodiments, left over 8K stand-alone chunks may be extents to support garbage collection.

According to one or more embodiments of the present invention, extents may be deduped at various lengths with one or more shift values. In some embodiments, dedup extents may be replaced with an offset into existing immutable extents. In some embodiments, level scans may have different maximum shift values or may even be merged. Accordingly, according to one or more embodiments of the present disclosure, metadata and fragmented data may be decreased, and performance may be improved.

The herein described subject matter sometimes illustrates different components contained within, or connected with, different other components. It is to be understood that such depicted architectures are merely exemplary, and that in fact many other architectures can be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected," or "operably coupled," to each other to achieve the desired functionality, and any two components capable of being so associated can also be viewed as being "operably couplable," to each other to achieve the desired functionality. Specific examples of operably couplable include but are not limited to physically mateable and/or physically interacting components and/or wirelessly interactable and/or wirelessly interacting components and/or logically interacting and/or logically interactable components.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to inventions containing only one such recitation, even when the same claim includes the introductory phrases "one or more" or "at least one" and indefinite articles such as "a" or "an" (e.g., "a" and/or "an" should typically be interpreted to mean "at least one" or "one or more"); the same holds true for the use of definite articles used to introduce claim recitations. In addition, even if a specific number of an introduced claim recitation is explicitly recited, those skilled in the art will recognize that such recitation should typically be interpreted to mean at least the recited number (e.g., the bare recitation of "two recitations," without other modifiers, typically means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B." Further, unless otherwise noted, the use of the words "approximate," "about," "around," "substantially," etc., mean plus or minus ten percent.

The foregoing description of illustrative embodiments has been presented for purposes of illustration and of description. It is not intended to be exhaustive or limiting with respect to the precise form disclosed, and modifications and variations are possible in light of the above teachings or may be acquired from practice of the disclosed embodiments. It is intended that the scope of the invention be defined by the appended claims, and their equivalents.

What is claimed is:

1. An apparatus comprising a processor having programmed instructions to:
    scan a first extent and second extent to identify duplicate data chunks having a first common length;
    emit hash values for data chunks in the first extent and the second extent;
    identify matching hash values of data chunks in the scanned first and second extents;
    upon identifying a match of hash values, emit a key-value to designate data chunks for de-duplication; and
    based on a bit map and a list of selected regions for de-duplication using key-value pairs, scan the first extent and the second extent for smaller size chunks of a second common length for de-duplication without having to de-duplicate the selected regions before the scan of smaller size chunks.

2. The apparatus of claim 1, wherein the processor is further programmed to update the bit map and the list of selected regions with new key-value pairs.

3. The apparatus of claim 2, using the bit map and the list of selected regions, scan the first extent and the second extent for even smaller size chunks of a third common length for de-duplication without having to de-duplicate the selected regions before the scan of even smaller size chunks; and
    updating the bit map and the list of selected regions with new key-value pairs.

4. The apparatus of claim 2, further comprising skipping candidate data chunks having matching hash values and calculating hash values on remaining data chunks at the second common length.

5. The apparatus of claim 2, wherein the second common length is calculated from a shift position different from that of the first common length.

6. The apparatus of claim 2, wherein a maximum number of shifts at the first common length is different from a maximum number of shifts at the second common length.

7. A computer-implemented method comprising:
    scanning, by a processor, a first extent and second extent to identify duplicate data chunks having a first common length;
    emitting, by the processor, for data chunks in the first extent and the second extent;
    identifying, by the processor, matching hash values of data chunks in the scanned first and second extents;
    upon identifying a match of hash values, emitting a key-value to designate data chunks for de-duplication; and based on a bit map and a list of selected regions for de-duplication using key-value pairs, scanning the first extent and the second extent for smaller size chunks of a second common length for de-duplication without having to de-duplicate the selected regions before the scan of smaller size chunks.

8. The method of claim 7, further comprising
updating the bit map and the list of selected regions with new key-value pairs.

9. The method of claim 8, using the bit map and the list of selected regions, scanning the first extent and the second extent for even smaller size chunks of a third common length for de-duplication without having to de-duplicate the selected regions before the scan of even smaller size chunks; and
updating the bit map and the list of selected regions with new key-value pairs.

10. The method of claim 8, further comprising skipping, by the processor, candidate data chunks having matching hash values and calculating hash values on remaining data chunks at the second common length.

11. The method of claim 8, wherein the second common length is calculated from a shift position different from that of the first common length.

12. The method of claim 8, wherein a maximum number of shifts at the first common length is different from a maximum number of shifts at the common second length.

13. A non-transitory computer readable medium containing program instructions that, when executed by a processor, cause the processor to perform operations comprising:
scanning a first extent and second extent to identify duplicate data chunks having a first common length;
emitting hash values for data chunks in the first extent and the second extent;
identifying for data chunks in the first extent and the second extent;
upon identifying a match of hash values, emitting a key-value to designate data chunks for de-duplication; and
based on a bit map and a list of selected regions for de-duplication using key-value pairs, scanning the first extent and the second extent for smaller size chunks of a second common length for de-duplication without having to de-duplicate the selected regions before the scan of smaller size chunks.

14. The non-transitory computer readable medium of claim 13, further comprising
updating the bit map and the list of selected regions with new key-value pairs.

15. The non-transitory computer readable medium of claim 14, further comprising using the bit map and the list of selected regions, scan the first extent and the second extent for even smaller size chunks of a third common length for de-duplication without having to de-duplicate the selected regions before the scan of even smaller size chunks; and
updating the bit map and the list of selected regions with new key-value pairs.

16. The non-transitory computer readable medium of claim 14, further comprising skipping candidate data chunks having matching hash values and calculating hash values on remaining data chunks at the second common length.

17. The non-transitory computer readable medium of claim 14, wherein the second common length is calculated from a shift position different from that of the first common length.

18. The non-transitory computer readable medium of claim 14, wherein a maximum number of shifts at the first common length is different from a maximum number of shifts at the second common length.

* * * * *